Patented Sept. 11, 1951

2,567,378

UNITED STATES PATENT OFFICE 2,567,378

PREPARATION OF PEPSINOGEN AND PEPSIN

Eugene P. Kennedy and Myron D. Grossnickle, Chicago, Ill., assignors to Armour and Company, Chicago, Ill., a corporation of Illinois No Drawing. Application February 15, 1947, Serial No. 728,951

8 Claims. (Cl. 195—66)

This invention relates to the preparation of pepsinogen and pepsin from raw sources of pepsinogen, such as animal stomach linings, etc.

An object of the present invention is to provide a new pepsinogen product and a process for producing the same. Another object is to provide a process for the production of pepsin from animal stomach linings and the like through the use of novel and relatively inexpensive steps resulting in a high yield of a product of high proteolytic activity. Yet another object is to provide a process in which the production of pepsinogen and pepsin from animal stomach linings is effected with accurate control and with high yields. Other specific objects and advantages will appear as the specification proceeds.

In a process comprising one form of our invention, ground animal stomach linings are extracted with a water-miscible organic solvent, such as, for example, alcohol, the suspension being made alkaline to the pH of the tissue and the extraction being carried on at low temperatures, as from $-10°$ to $+5°$ C. The linings may be separated from the solution by centrifuging or any other means, and to the solution is added an ion-producing substance to produce a precipitate in the solution. The precipitate is a complex of pepsinogen and the precipitating ion and is highly useful as a final product or source of pepsinogen. The pepsinogen may be freed from the complex by appropriate chemical means. Alternatively, the complex of pepsinogen and the precipitating ion may be treated with acid and at a higher temperature to convert the pepsinogen to pepsin, and the solution may be clarified and concentrated to produce a substantially pure pepsin product.

We have found that unusually good results are obtained through the carrying out of the process at low temperatures. The low temperature protects the labile proenzyme from the deleterious effect of higher temperature, and, more importantly, it limits the solubility of the inert material in the animal stomach linings, while allowing the pepsinogen to go into solution. As a result, not only is the pepsinogen obtained in good yield, but the potency, based on activity per unit weight of dissolved material, is also very high. We prefer to work at temperatures close to $-5°$ C., but lower and higher temperatures can be used. A very satisfactory temperature range is $-10°$ to $+5°$ C.

Any suitable alkali may be used with the alcohol or other water-miscible organic solvent in the extraction step. We prefer to add sufficient alkali to bring the pH between 7 and 8.5. The water-miscible organic solvent may include acetone, methanol, ethanol, propanol, and ethylene glycol, or any other suitable water-miscible organic solvent. Excellent results have been obtained with the use of ethanol at a concentration of 40%. The exact concentration of ethanol is not critical and good results have been obtained with 20% to 60% ethanol. A concentration of about 40% ethanol, however, has many advantages, and the extraction may be made by adding to the ground animal stomach linings about 4 volumes of cold 50% ethanol and suspending the tissue by good mechanical agitation. The percentage concentrations herein given refer to the volumes of organic solvent contained in 100 volumes of the extraction mixture.

In adding alkali to make the pH of the solution alkaline to the natural pH of the tissue, we have found it desirable to add the alkali slowly with good stirring. For example, in the adding of an alkali, such as sodium hydroxide, the sodium hydroxide is added slowly with good stirring, through a capillary device, in such quantity that the final pH of the suspension becomes 7.0 to 8.5. In an extraction of ground hog stomach linings, this may require about 30 cc. of normal sodium hydroxide per kilogram of the ground stomach linings extracted.

The tissue is separated from the extract by any convenient method, such as by filtration, centrifuging, etc. The extract, which may be called extract A, is found to contain pepsinogen in good yield.

Extract A may now be treated with protein-precipitating agents, such as, for example, reagents producing calcium ions, trichloroacetate ions, ferric ions, or the like. Thus, we may use cationic or anionic reagents to bring about the desired precipitation. In this operation, appropriate adjustment of the pH of the solution may be desired in order to precipitate the pepsinogen salt most effectively.

We have found that unusually good results have been obtained through the use of cationic reagents, of which calcium acetate is an unusually good example. The cationic reagents may include calcium, barium, magnesium, iron, and all of the reagents included under the usual class of "heavy metals." As an example, to extract A may be added $\frac{1}{20}$ of its volume of cold 5% calcium acetate solution, the solution being stirred well and maintained at a temperature in the range of $-10°$ to $+5°$ C. The precipitate is formed as a bright red paste and collected by passing through a continuous centrifuge. This precipitate, which may be indicated as precipitate B, is found to contain nearly all of the potential proteolytic activity of extract A.

As an anionic reagent, we find that any protein precipitating acid may be employed, and that particularly effective among such acids is trichloroacetic acid. Tannic acid, picric acid, and sulfosalicylic acid are also very effective. These reagents result in salts of pepsinogen and such protein-precipitating acids. For example, pepsinogen trichloroacetate, pepsinogen picrate, pepsinogen tannate, etc. are produced and recovered in the precipitate.

When cationic reagents are employed, such as the heavy metals, heavy metal salts of pepsinogen are obtained in the precipitate. These also are useful as a commercial product and may be sold as such. Calcium pepsinogenate is especially desired as a commercial product and is obtained as precipitate B indicated above.

Should it be desired to sell a pepsin product, the conversion from pepsinogen to pepsin, while at the same time eliminating inert protein portions of the complex, can be effected readily by acidifying, warming, and clarifying. For example, the precipitate B may be suspended in water and the suspension acidified to a pH below, say, 4.5. Ordinarily, it is more convenient to acidify to about pH 2.0, but the exact pH value is not critical. Under these conditions, the calcium-pepsinogen complex dissolves. The suspension may be warmed to about 25° C., and clarified. For example, the clarification may be done by centrifuging the suspension and then filtering the centrifugate. The filtrate, which may be referred to as filtrate C, is quite clear and it contains most of the potential proteolytic activity present in the original extract A. Filtrate C may be concentrated and dried, or, alternatively, the proteolytic enzyme may be precipitated out by adding to the solution alcohol or acetone in the cold, for example a volume of cold 95% ethanol and 2 volumes of cold acetone. The product obtained in either case is a dry, white, or light yellow powder, which assays about 1-20,000 to 1-30,000 when tested for peptic activity by the methods of U. S. Pharmacopoeia XI.

Specific examples illustrating the process may be set out as follows:

*Example 1*

A suspension of 3 kilograms of cold ground hog stomach linings in 12 liters of 25% ethanol was prepared at a temperature of —3° C. To the suspension was added 400 ml. of 0.5 molar disodium phosphate slowly with good stirring. Final pH of the suspension after the addition of the disodium phosphate was 7.4. The suspension was agitated mechanically for several hours, and the extract was then separated from the tissue by centrifugation. A yield of 13.2 liters of extract was thus obtained, which was found to have proteolytic activity, when converted into pepsin, equivalent to 60 mg. of 1-3000 National Formulary Standard pepsin per ml. of extract.

*Example 2*

To 700 grams of ground frozen hog stomach linings were added 2800 ml. of 50% ethanol. Temperature of the suspension was maintained at —4° C. To the suspension was added 250 ml. of 0.5 molar disodium phosphate. The pH at the end of the addition was 7.8. The extract was separated from the tissue by straining through cheesecloth and filtering. The filtrate contained proteolytic activity when converted to pepsin equivalent to 43 mg./ml. of 1-3000 National Formulary Standard pepsin.

To a portion of this filtrate, maintained at —5° C. was added 1/20 of its volume of a solution of 10% trichloroacetic acid in 50% ethanol at —5° C.

The precipitate which formed was separated by centrifugation at —5° C. The centrifugate when assayed was shown to have no proteolytic activity. When the precipitate was dissolved in water and assayed, it was demonstrated to contain all of the potential proteolytic activity of the sample taken.

*Example 3*

To a portion of the extract obtained in Example 2, was added 1/16 of its volume of a solution containing 10% ferric chloride. The precipitate, which formed and was collected at —5° C., was assayed and shown to contain more than half of the potential activity of the sample taken.

*Example 4*

A suspension of 3.68 kg. of frozen ground hog stomach linings in 14.7 liters of 50% ethanol was prepared at a temperature of —3° C. To the suspension were added 125 ml. of normal sodium hydroxide solution slowly and with good stirring. The pH of the suspension became 8.0. The tissue was separated from the extract by straining through cheesecloth and 15 liters of extract were thus obtained which had a proteolytic activity when converted to pepsin equivalent to 50 mg./ml. of 1-3000 (N. F.) pepsin.

To this extract was added 1/20 volume of a solution of 5% calcium acetate, maintaining the temperature of the extract at —5° C. The suspension was allowed to stand overnight in a room maintained at —5° C. and was centrifuged at the same temperature to obtain 410 gm. of a red-colored precipitate containing 90% of the potential activity of the original extract.

*Example 5*

One hundred kilograms of frozen ground hog stomach linings were suspended in 400 liters of 53.3% ethanol at a temperature of —5° C. To this suspension were added slowly and with good stirring, three liters of normal sodium hydroxide. The pH of the suspension after stirring overnight at —5° C. was 7.6. The suspension was then centrifuged in a continuous Sharples centrifuge maintained at a temperature of —5° C., and 435 liters of centrifuge were obtained. To this centrifuge, 21.75 liters of 5% calcium acetate were added and the suspension allowed to stand overnight. The suspension was then centrifuged and 7.2 kg. of precipitate obtained. These operations were conducted at —5° C. This wet precipitate was assayed and found to contain a proteolytic activity when converted into pepsin equivalent to 1-9700 (N. F.) pepsin.

*Example 6*

An extraction of 454 kilograms of frozen ground hog stomach linings with four volumes of 50% ethanol at —5° C. was carried out exactly as in Example 5. To the 1040 liters of the extract so obtained were added 52 liters of 5% calcium acetate, as in Example 5. 23 kilograms of precipitate were obtained upon centrifugation. A 500 gm. sample of this precipitate was dried and yielded 120 gms. of dried powder which had a proteolytic activity when converted into pepsin equivalent to 1-20,000 (N. F.) pepsin.

Example 7

A total of 39.9 kilograms of calcium-pepsinogen precipitate was prepared exactly as in Example 5 from 200 kg. of linings and was suspended in three times its volume of 0.9% sodium chloride. The pH was adjusted to 2.0 and the temperature raised to 20° C. The pepsinogen was thus converted into pepsin. The suspension was clarified, and the clarified solution was dried. Weight of the dried powder was 3.9 kilograms. Potency of the dried powder was 1–19,000 N. F.

While in the foregoing specification, we have set out in considerable detail specific methods and steps and specific materials as illustrative of the invention, it will be understood that such details may be varied widely by those skilled in the art without departing from the spirit of our invention.

We claim:

1. In a process for the recovery of pepsinogen from a raw pepsinogen-bearing source, the step of extracting pepsinogen at a temperature of $-10°$ to $-5°$ C. by the use of an alkaline alcohol solution, the alcohol being selected from the group consisting of methanol, ethanol, and propanol.

2. In a process for the recovery of pepsinogen from a raw pepsinogen-bearing source, the step of extracting pepsinogen by the use of an alkaline alcohol solution at a temperature of $-10°$ to $+5°$ C., the alcohol being selected from the group consisting of methanol, ethanol, and propanol.

3. In a process for producing pepsinogen, the steps of extracting at a temperature of $-10°$ to $-5°$ C. a raw source of pepsinogen with an alkaline alcohol solution, the alcohol being selected from the group consisting of methanol, ethanol, and propanol, adding a cationic precipitating reagent to the solution to form a pepsinogen salt precipitate, and separating the precipitate.

4. In a process for producing pepsinogen, the steps of extracting at a temperature of $-10$ to $-5°$ C. a raw source of pepsinogen with an alkaline ethanol solution, adding an ion-producing substance to the solution to form a precipitate, and separating the precipitate.

5. In a process for producing pepsinogen, the steps of extracting at a temperature of $-10°$ to $-5°$ C. a raw source of pepsinogen with an alkaline ethanol solution having a concentration in the neighborhood of 40%, adding an ion-producing substance to the solution to form a precipitate, and separating the precipitate.

6. In a process for producing pepsin, the steps of extracting at a temperature of $-10°$ to $-5°$ C. a raw source of pepsinogen with an alkaline alcohol solution the alcohol being selected from the group consisting of methanol, ethanol, and propanol, adding an ion-producing substance to the solution to precipitate a pepsinogen salt, separating the precipitate, and forming an acid solution thereof to convert the pepsinogen to pepsin.

7. In a process for producing pepsin, the steps of extracting animal stomach linings with an alkaline alcohol solution the alcohol being selected from the group consisting of methanol, thanol, and propanol, adding a cationic reagent to the solution to produce a complex of pepsinogen and inert protein, said treating steps being carried on at a temperature in the range of $-10°$ to $+5°$ C., then raising the temperature of said complex in an acid solution, filtering the solution, and concentrating the filtrate.

8. In a process for producing pepsinogen, the steps of extracting, at a temperature of $-10°$ to $-5°$ C., a raw source of pepsinogen with an alkaline ethanol solution having a concentration in the neighborhood of 40%, adding trichloroacetic acid to form a precipitate, and separating the precipitate.

EUGENE P. KENNEDY.
MYRON D. GROSSNICKLE.

REFERENCES CITED

The following references are of record in the file of this patent:

UNITED STATES PATENTS

| Number | Name | Date |
| --- | --- | --- |
| 1,296,600 | Muto | Mar. 4, 1919 |
| 2,145,796 | Keil et al. | Jan. 31, 1939 |
| 2,337,947 | Thornley et al. | Dec. 28, 1943 |

OTHER REFERENCES

Science V83 (1936), pages 469–470, by Herriott and Northrop.

Enzymes by Sumner et al. 1943 edition, page 27.